United States Patent [19]
Goldberg et al.

[11] Patent Number: 5,741,057
[45] Date of Patent: Apr. 21, 1998

[54] DEVICE FOR DISPLAYING A PROJECTED IMAGE

[76] Inventors: Gerald K. Goldberg, 500 E. Wadsworth Ave., Philadelphia, Pa. 19119; Richard J. Rhindress, 128 Spruce La., Collegeville, Pa. 19426

[21] Appl. No.: 636,026

[22] Filed: Apr. 22, 1996

[51] Int. Cl.⁶ ............................................. G03B 21/28
[52] U.S. Cl. ....................................... 353/74; 353/78
[58] Field of Search ............................. 353/74, 76, 77, 353/78, 79, 119; 348/744, 786, 787, 789, 794

[56] References Cited

U.S. PATENT DOCUMENTS

| | | | |
|---|---|---|---|
| 2,762,256 | 9/1956 | Gottschalk | 353/78 |
| 2,763,178 | 9/1956 | Gottschalk | 353/78 |
| 4,875,064 | 10/1989 | Umeda et al. | 353/78 |
| 5,278,595 | 1/1994 | Nishida et al. | 353/78 |
| 5,491,585 | 2/1996 | Dolgoff | 353/78 |
| 5,580,146 | 12/1996 | Maslow | 353/77 |

FOREIGN PATENT DOCUMENTS 3083038  4/1991  Japan ................................. 353/74

*Primary Examiner*—William Dowling
*Attorney, Agent, or Firm*—Stuart E. Beck

[57] ABSTRACT

A device for displaying a projected image comprising a housing having a rear projection screen, a projector and a plurality of reflectors. The projector and the reflectors define a projection path that is longer than the depth of the housing.

3 Claims, 1 Drawing Sheet

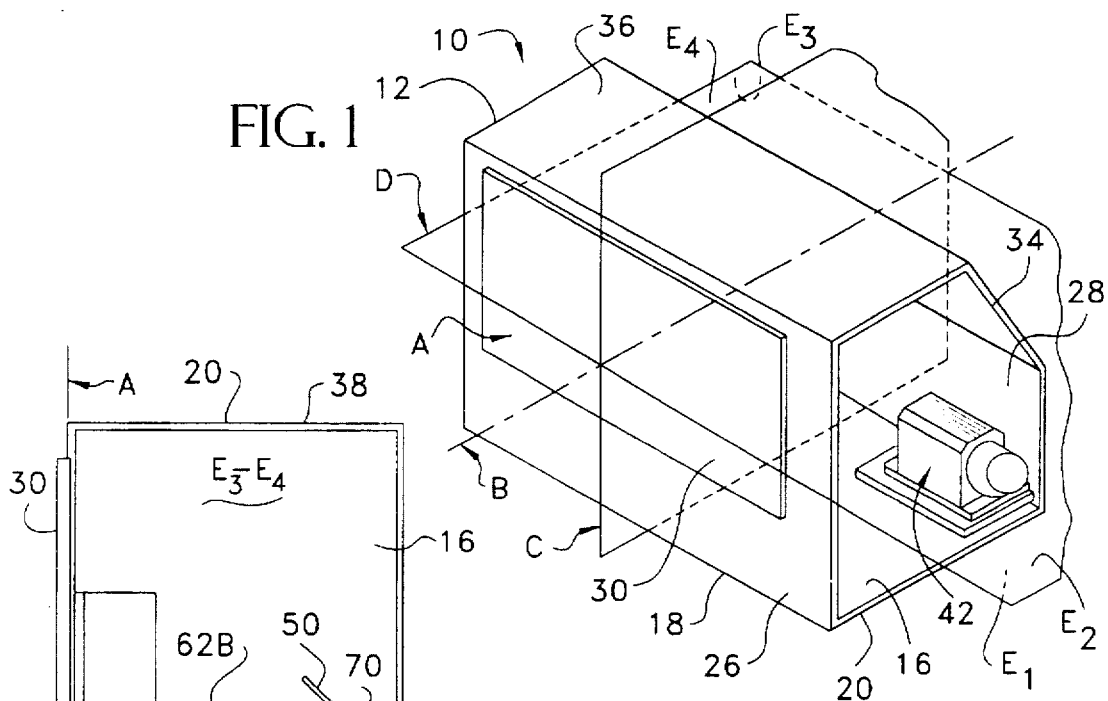
FIG. 1
FIG. 2
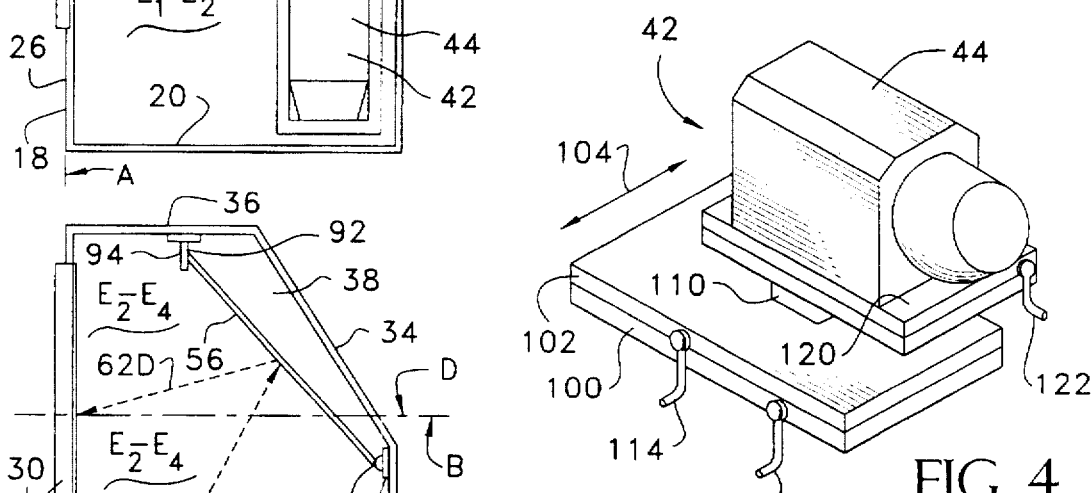
FIG. 3
FIG. 4

DEVICE FOR DISPLAYING A PROJECTED IMAGE

FIELD OF THE INVENTION

This invention relates to a device having a rear projection screen for displaying images and more particularly to a device of minimum depth.

BACKGROUND OF THE INVENTION

It would be desirable to have a relatively compact device that can be set up in a room or office which would be capable of displaying an image projected from a slide or the like which can be enlarged to a size sufficiently large to be seen by an audience of several dozen people.

Preferably, such a device should be relatively shallow compared to its height and width. This would enable it to be placed against one of the walls with the remainder of the room or office containing seats for the people viewing the images.

SUMMARY OF THE INVENTION

With the foregoing in mind, the invention relates to a device for displaying a projected image that has a housing which supports a rear projection screen. A projector is provided. The projector is supported in the housing as are a plurality of reflectors. The projector and reflectors define a projection path that has a first portion that is parallel to the plane of the rear projection screen and a last portion that is in a plane that is perpendicular to the plane of the rear projection screen that enables an image emanating from the projector to be projected on to the rear surface of the rear projection screen.

DESCRIPTION OF THE DRAWING

The invention can be further understood by referring to the accompanying drawing of a presently preferred form thereof, and wherein:

FIG. 1 is a perspective view showing a display device for displaying a projected image which has been constructed in accordance with a presently preferred form of the invention.

FIG. 2 is a plan view of the interior of the display device.

FIG. 3 is a side elevation view of the interior of the display device.

FIG. 4 is a three quarter view of the adjustable carriage for supporting a projector in the display device.

DESCRIPTION OF A PREFERRED FORM OF THE INVENTION

Now referring to the drawings for a detailed description of the invention, in FIG. 1 a display device 10 constructed in accordance with the invention is illustrated.

The display device comprises a housing 12 having a rectangular base 16. The rectangular base 16 is defined by two parallel elongated sides 18 and two parallel short sides 20. The base may be comprised of a plurality of transverse beams that are connected between beams comprising the elongated sides 18, or the base may comprise a floor as illustrated. Preferably the rectangular floor and beams are made from aluminum or other light weight material to permit ease of handling.

Sides 18 define a major dimension while sides 20 define a minor dimension. The major and minor dimensions are at right angles to each other.

One of the elongated sides 18 of the rectangular base 16 supports front and rear walls 26 and 28. Front wall 26 includes an opening in which is received a rear projection screen 30 whose location coincides with a plane A. As is well known rear projection screens are designed so that the people viewing the screen are in front of it while the projection equipment projects the image on to the rear of the screen. As will be more fully explained, the rear projection screen defines a first vertically disposed plane A. Centrally located and rearwardly extending axis B is perpendicular to plane A. The term "centrally located" should be understood to mean "the center of the projected image." Thus, the center of the projected image need not necessary coincide with the center of the rear projection screen since if several images are projected simultaneously each image might be projected onto a different portion of the screen.

The rear wall 28 may be connected by a sloping wall 34 to one edge of a top wall 36 whose other edge is supported by the front wall 26. End walls 38 (one of which has been removed) closes the ends of the housing.

The walls 26, 28, 34, 36 and 38 may be comprised of light weight frames to permit easier handling and assembly. The frames may be made of aluminum or other light weight materials.

As best seen in FIGS. 2 and 3 the rectangular base 16 supports a projector assembly 42 that includes a projector 44. The projector may of a type that is commercially available and which has an adjustable focus.

Additionally, the housing 12 and base 16 support a plurality of reflectors 50, 54 and 56. Preferably, the reflectors are comprised of rigid substrates that are coated with reflective material. It is presently preferred that the substrates be comprised of MYLAR or glass that is coated with a layer of reflective material such as aluminum to create a mirrored surface.

The reflectors 50, 54, and 56 cooperate with the projector 44 to define a projection path comprising portions 62A, 62B, 62C and 62D between the projector 44 and the rear of the rear projection screen 30.

As best seen in FIG. 2 the projector 44 may be placed against the rear wall 28. The projection path portion 62A extends from the projector in a direction that is generally parallel to plane A. Preferably, projection path portion 62A is horizontal.

The first reflector 50 may comprise a rectangular mirror that is supported on the rectangular base 16 as by being pivotally connected to an upwardly directed standard 70 that is mounted to the base. The reflector 50 is supported on the standard so that it lies in the path of projection path portion 62A. The reflector 50 may be pivoted about standard 70 to deflect the projection path portion 62A at a right angle to create another projection path portion 62B. Projection path portion 62B lies in a vertical plane that is parallel to or is coincident with the vertical plane C in which axis B is located.

A second reflector 54 which may comprise a rectangular mirror that is supported by the rectangular base 16 and front wall 26 lies in front of projection path portion 62B. To this extent, the lower edge 74 of reflector 54 is connected to the rectangular base 16 by a plurality of pivotal connections 76, only one of which can be seen in FIG. 3. The upper edge 80 of reflector 54 is connected to a bracket 82 which is supported by front wall 26. The upper edge 80 of reflector 54 can be pivoted about pivotal connections 76 and secured in a desired location by bracket 82.

Reflector 54 is preferably pivoted about pivotal connections 76 so that it reflects projection path portion 62B in the direction indicated as projection path 62C toward reflector 56.

In a manner similar to reflector 54, reflector 56 may comprise a rectangular mirror. The lower edge 86 of reflector 56 is pivotally connected by connector 88 to rear wall 28. The upper edge 92 of reflector 56 is connected to a bracket 94 which is supported by either sloping wall section 34 or top wall section 36 as shown.

Reflector 56 is adjusted by being pivoted around pivotal connector 88 until the projection path portion 62C coming from reflector 54 is reflected as projection path 62D which preferably lies in a substantially horizontal plane that is parallel to a horizontal plane D in which axis B is located so that it strikes the rear surface of rear projection screen 30.

As explained, planes C and D are perpendicular to each other and are perpendicular to plane A. Consequently, they define eight juxtaposed sectors. Four of the sectors, $E_1$, $E_2$, $E_3$, and $E_4$ are on the projector side of plane A and four of the sectors (no reference numerals) are on the other side of plane A.

Referring to the four juxtaposed sectors on the projector side of plane A, it can be seen that the projector assembly 42 is located in a sector $E_1$, that is to one side of plane C and below plane D. However, the projector assembly 42 could be in any of the other sectors $E_2$, $E_3$ or $E_4$ or be in more than one sector and still be within the spirit and scope of the invention.

It should be noted that this arrangement enables the sum of the projection paths 62A, 62B, 62C, and 62D to be greater than either the major dimension or the minor dimension of the housing 12. This is significant since it permits an image which is relatively modest in size that emanates from the projector 44 to be substantially enlarged by the time that it is projected on to the rear projection screen 28.

In one presently preferred form of the invention, a housing having a base whose major dimension is 11 feet and whose minor dimension is 5½ feet and whose height is 8½ feet is capable of providing a projection path having a length of about 12 feet. This enables the display device 10 to project an image that fills a rectangular rear projection screen having a width of 8 feet and a height of 6 feet. Thus, it can be placed in an executive's office or small room and can create an image on the rear projection screen that is the same size and of greater brilliance as one that if projected on a front reflective screen would require a straight line distance of more than 16 feet (assuming that the projector is five feet long).

Referring to FIG. 4, projector assembly 42 which is located in sector $E_1$ can be seen to comprise a bed 100 which is mounted on the rectangular base 16.

The bed 100 supports a transverse carrier 102 which is movable in a well known manner at right angles to projection path 62A in the direction indicated by double headed arrow 104 by a suitable means such as the hand crank 106 or an electric screw actuator as is well known.

The transverse carrier 102 carries a rack 110 that supports a vertical carrier 112 that engages a pinion (not shown) in the transverse carrier 102. The height of the projector 44 can be varied by a suitable means such as hand crank 114 which when rotated raises and lowers the vertical carrier 112 or an electric screw actuator as is well known.

The vertical carrier 112 supports a projector bed 120 which can be moved longitudinally of the vertical carrier 112 and along the projection path 62A by a suitable means such as the hand crank 122 or a screw actuator as is well known.

In operation, the display device 10 is erected in the desired location such as an office, conference room, or the like. A suitable projector 44 is connected to the projector bed 120. By adjusting the transverse carrier 102, vertical carrier 112, and projector bed 120, the projector 44 can be positioned so that the image projected from it is directed along projection path portion 62A to strike the first reflector 50.

The reflector 50 is adjusted by being pivoted around its pivotal connection to standard 70 so that it directs the projection path portion 62B toward reflector 54. Reflector 54 is adjusted by being pivoted about pivotal connection 76 so that it reflects the projection path portion 62B toward reflector 56 as projection path portion 62C. Reflector 56 is adjusted by being pivoted around its pivotal connection 88 so that projection path portion 62C is reflected toward the rear of the projection screen 28 as projection path portion 62D.

The advantage of this structure is that a by turning the projection path at right angles from plane C into plane D a relatively small housing 12 is able to enlarge an image substantially beyond that which would be expected for one of its size. This advantage is caused by the fact that the reflectors, 50, 54 and 56 increase the projection path to a length which is substantially greater than any dimension of the housing 12. Further this is accomplished by turning the projector so that projection path portion 62A is generally parallel to the rear projection screen 30.

While the invention has been described with reference to one presently preformed form it is apparent in other forms will be obvious to those of skill in the art in view of the foregoing description. Thus, the invention should not be limited by that description, but rather, only by the scope of the appended claims.

We claim:

1. A device for displaying a projected image comprising:

a housing, said housing comprising a rectangular base having a floor, a major dimension defined by two long sides, and a minor dimension defined by two short sides, said major and minor dimensions being at right angles to each other, a rear projection screen, said screen being supported along one of the sides of said base and extending in the same direction as said major dimension, a projector, connection means connected between said projector and said housing for moving said projector relative to said floor, said connection means comprising a carriage, said carriage supporting said projector so that it projects an image along a projection path that is in the same direction as said major dimension, said connection means being operative to selectively move said projector transversely of said projection path and parallel to said projection path, a plurality of reflectors supported in said housing, said plurality of reflectors comprising a first reflector being disposed in the projection path emanating from said projector and being disposed at an angle relative to said projection path so that it changes the direction of said path, said projector and said reflectors defining said projection path to enable an image emanating from said projector to be projected onto the rear surface of said rear projection screen, and said projection path is longer than the distance between said two long sides.

2. A device for displaying a projected image comprising:

a housing, said housing comprising a rectangular base having a floor, a major dimension defined by two long sides, and a minor dimension defined by two short sides, said major and minor dimensions being at right angles to each other, a rear projection screen, said screen being supported along one of the sides of said base and extending in the same direction as said major dimension, a projector, said projector being supported in said housing on said base and being disposed so that it projects an image along a projection path that is in the same direction as said major dimension, a plurality of reflectors supported in said housing, said plurality of reflectors comprising a first reflector being disposed in the projection path emanating from said projector and being disposed at an angle relative to said projection path so that it changes the direction of said path, adjustment means connected between said floor and said first reflector, said adjustment means being pivotally connected to said first reflector so that said first reflector can be pivoted relative to said projector, said projector and said reflectors defining said projection path to enable an image emanating from said projector to be projected onto the rear surface of said rear projection screen, and said projection path is longer than the distance between said two long sides.

3. A device for displaying a projected image comprising:

a housing, said housing comprising a rectangular base, a major dimension defined by two long sides, and a minor dimension defined by two short sides, said major and minor dimensions being at right angles to each other, a rear projection screen, said screen being supported along one of the sides of said base and extending in the same direction as said major dimension, said screen having a front surface and a rear surface, said rear surface facing the interior of said housing enclosed by said long and short sides and said floor, a projector, said projector being supported in said housing on said base and being disposed so that it projects an image along a projection path that is in the same direction as said major dimension, at least first, second and third reflector supported in said housing, said first reflector being disposed in the projection path emanating from said projector and being disposed at an angle relative to said projection path so that it changes the direction of said path, said second and third reflectors being rectangular, being disposed along said major dimension of said housing and lying in perpendicular relation to said projection path, a framework for supporting each of said second and third reflectors, each of said frameworks including means defining a pivotal connection for connecting it to the lower edge of its respective reflector so that the angles of said reflectors relative to the projection path can be adjusted so that the image projected by said projector is directed to the rear of said rear projection screen, said projector and said reflectors define said projection path to enable an image emanating from said projector to be projected onto the rear surface of said rear projection screen, and said projection path is longer than the distance between said two long sides.

\* \* \* \* \*